INVENTORS *E. C. HELLSTROM*
*H. N. WAGAR*

BY

*ATTORNEY*

United States Patent Office 3,510,760
Patented May 5, 1970

3,510,760
METHOD FOR MEASURING CONTACT RE-
SISTANCE IN MAGNETICALLY OPERA-
BLE SWITCHES BY ACCOUNTING FOR
FLUX INTERACTIONS
Edward C. Hellstrom, Jersey City, and Harold N. Wagar,
Madison, N.J., assignors to Bell Telephone Labora-
tories, Incorporated, Murray Hill and Berkeley Heights,
N.J., a corporation of New York
Filed Oct. 14, 1966, Ser. No. 586,891
Int. Cl. G01r 27/14
U.S. Cl. 324—28          5 Claims

ABSTRACT OF THE DISCLOSURE

A method is disclosed in which two independent meas-
urements of contact resistance in sealed contact reed
switches are combined with a polarity reversal of cur-
rent in the contacts or flux applied to close the contacts.

---

This invention relates to a procedure for accurately
measuring contact resistance in switches having encap-
sulated contacts.

Broadly, the object of this invention is to improve the
manner in which defective switches are detected during
manufacture.

Contact resistance is the term conventionally used to
describe the ohmic resistance between the closed contacts
of a switch. While generally important in all switches it
is a particularly critical factor in switches having encap-
sulated contacts, viz, in sealed contact reed switches such
as the type disclosed in Pat. 2,187,115 issued to W. B.
Ellwood et al. on Jan. 16, 1940.

In the manufacture of sealed contact reed switches,
contact resistance is measured after the reeds are sealed
in the encapsulating vessel. Specifically, the contacts in
each tested switch are closed by a test coil. Thereafter a
current of fixed magnitude is passed through the closed
contacts. Contact resistance is measured in terms of the
electrical potential developed across the closed contacts
when conducting a current of predetermined magnitude
and those switches are rejected which exhibit a potential
exceeding a predetermined value. The remaining switches
are returned to the production line for further processing.

Later, the remaining switches are given a final contact
resistance test. Heretofore, many of these switches have
inexplicably failed. More important, in spite of the in-
tensive testing many switches which do not fail subse-
quently exhibit unsatisfactory contact resistance in the
hands of the ultimate user.

It is, therefore, an object of this invention to reduce
the number of switches with unsuitable contact resist-
ance which escape detection.

According to one embodiment of this invention, the
switches are subjected to reverse polarity testing. By re-
verse polarity testing it is meant that the contact resistance
in each switch is measured in two phases. Specifically, the
switch is operated twice by a test coil and, each time it
is operated, current is passed through its contacts.

According to one feature of this invention, the mag-
netic polarity of the test coil remains unchanged during
both phases of the reversed polarity test but the direc-
tion of the current flowing through the contacts is reversed
in each phase.

According to another feature of this invention, the
direction of current flowing through the contacts in both
phases remains unchanged but the magnetic polarity of
the test coil is reversed.

Figure 1:
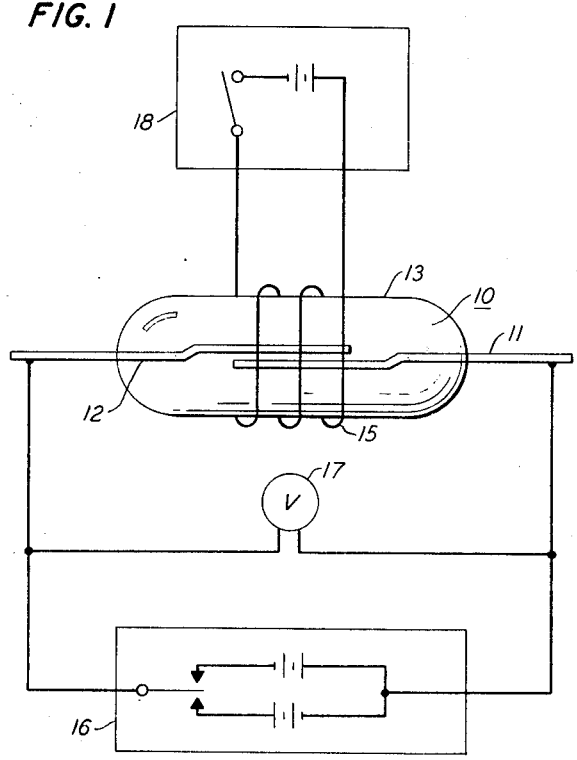
Figure 2:
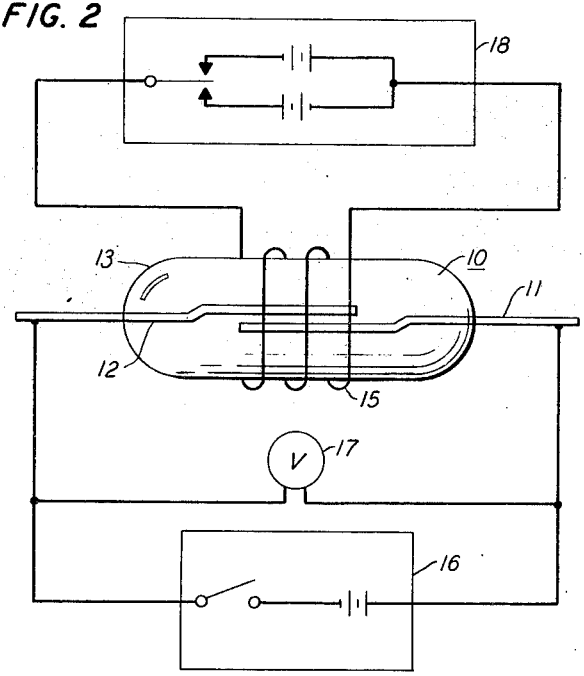

A better understanding of this invention will be assisted
by the following detailed description when taken with the
accompanying drawing in which:

FIG. 1 illustrates a switch disposed in a test coil and
connected to a current source, the test coil having a fixed
magnetic polarity and the current source being arranged
to direct current through the switch contacts in opposite
directions, and FIG. 2 illustrates a switch disposed in a test coil and
connected to a current source, the test coil having re-
versible magnetic polarity and the current source being
arranged to send current through the switch in only one
direction.

Typically, the testing apparatus for measuring contact
resistance comprises a jig for holding the switch to be
tested, a test coil surrounding the space to be occupied
by the switch, a current source supplying current to the
test coil, a current source for supplying current to the
terminals of the switch, and a meter for recording the
potential developed across the switch contacts during test-
ing. This apparatus is well known and, consequently, is
not described in detail here. Rather, the following descrip-
tion is focused on the manner in which the apparatus is
used.

Referring to FIGS. 1 and 2, a switch 10 is disclosed.
It is a typical reed switch and basically comprises a pair
of overlapping, magnetically responsive reeds or contacts
11 and 12 sealed in a vessel 13. Typically, the contacts 11
and 12 are sealed in the vessel 13 so that their overlapping
ends are separated by an air gap.

As shown in FIG. 1, the switch 10 is encircled by a test
coil 15. A current source 16 and a volt meter 17 are con-
nected across the contacts 11 and 12 and a current source
18 is connected across the terminals of the test coil 15.
The current source 16 and the current source 18 supply
current to the contacts 11 and 12 and the test coil 15, re-
spectively, while the volt meter 17 measures the potential
development across the contacts 11 and 12 during testing.

The particular contents of the current source 16 and
the current source 18 are relatively unimportant so long
as each is able to supply a current of predetermined mag-
nitude and polarity at predetermined intervals to the con-
tacts 11 and 12 and the test coil 15, respectively. Current
sources having these functions are readily designed by
any skillful circuit designer. Consequently, for clarity, the
contents of each has been disclosed merely in simple
schematic form.

In operation, the current sources 16 and 18 are oper-
ated so as to close the contacts 11 and 12 and then cause
a current to flow through the closed contacts. The volt
meter 17 then indicates the magnitude of the potential
developed across the closed contacts. Switches exhibiting
unsatisfactory readings on the volt meter 17 are rejected
and those which are satisfactory are returned to produc-
tion for further processing.

In the particular embodiment being described, contact
resistance is measured in two steps or phases. First it is
measured with current flowing through the contacts in
one direction and then it is measured with current flowing
through the contacts in the opposite direction.

Contact resistance measurements are made in two
phases because two magnetic fluxes interact each time
contact resistance is measured. The first flux comes from
test coil 15 while the second flux comes from the current
flowing through the contacts. Exactly what happens when
thes two fluxes interact is not completely understood. It
is known, however, that their interaction causes a shift
in the point of contact between the faces of the two
contacts 11 and 12. In other words, the faces of the
contacts 11 and 12 engage at one point when the fluxes
interact one way and at another point when the fluxes
interact in a different way.

It has been found that contact resistance often changes
when the point of contact shifts. In fact, many times the change is so drastic that the switch is unusable and must be rejected. The data summarized below contains results of reverse polarity tests made on a selected group of tested switches and demonstrates typical variations. The summarized measurements were made in a test jig using a test coil delivering 100 N.I. initially and approximately 20 N.I. at measurement and a current source supplying .100 ampere.

TABLE—CONTACT RESISTANCE IN MILLIOHMS

| Switch sample | Unidirectional contact current and reversed test coil flux | | Unidirectional test coil flux and reversed contact current | |
|---|---|---|---|---|
| | + | − | + | − |
| A-15 | 70.2 | 61.9 | 66.9 | 61.9 |
| A-32 | 74.7 | 63.2 | 73.5 | 64.2 |
| B-97 | 74.5 | 61.4 | 72.4 | 62.3 |
| B-100 | 72.2 | 62.7 | 70.5 | 63.1 |
| B-120 | 71.4 | 64.2 | 70.7 | 64.4 |
| H-6 | 70.7 | 230.8 | 70.1 | 385.7 |

As can be seen from the data, the polarity reversal test can be made in several different ways. For example, as shown in FIG. 1, the current source 18 establishes a unidirectional magnetic flux along the long axis of the switch 10. The current source 16, on the other hand, is arranged to provide current flow through the contacts 11 and 12 in opposite directions.

Similarly, as shown in FIG. 2, the current from the current source 16 is unidirectional. The current source 18, however, is arranged to deliver current to the test coil 15 in opposite directions thereby establishing a magnetic flux of opposite polarity along the long axis of the switch 10.

In performnig contact resistance tests on switches known in the Bell System as the 237-type the test coil 15 is arranged to deliver a minimum of 50 N.I. initially and a maximum of 20.5 N.I. during hold, during which time the measurements are made. Measurements are corrected to a length of 1.385 inches between resistance probes and are made at a temperature corrected to 68° F.

The measuring sequence is carefully timed. Specifically, the current source 18 is adjusted to have a maximum rise time constant of .001 second and is connected for a minimum of .003 second before current decay begins. After decay begins, the current source 18 is arranged so that decay occurs in a critically damped or overdamped manner which allows steady state to be reached within a minimum of .010 second.

The current source 16, on the other hand, is arranged to connect .002 second after the current from the current source 18 reaches steady state value. Furthermore, it is arranged to disconnect .001 second before the current from the current source 18 is interrupted.

Measurement of contact resistance begins .007 second after the current from the current source 18 has reached its steady state. It terminates .001 second before the current source 16 is interrupted.

The foregoing sequence is repeated for the second phase of the measurement and the time between the two phases is carefully controlled. Specifically, off-time for the test coil 15 is .075 second between successive operations.

In summary, a technique has been disclosed by which switches having defective contact resistance are readily detected during manufacture. While important embodiments of the invention have been disclosed, it will be recognized that these are only illustrative of the principles of the invention and many others falling within its scope will readily occur to those skilled in the art.

What is claimed is:

1. In a method for measuring the contact resistance of normally opened magnetically responsive contacts made of homogenous contact material and encapsulated in a vessel, the steps of:
   closing said contacts by applying a magnetic flux directly thereto;
   passing a current through said magnetically closed contacts first in one direction and then in the opposite direction; and
   separately and independently measuring the potential developed across said contacts in response to each application of said current.

2. In a method for measuring the contact resistance of normally opened contacts encapsulated in a vessel the steps of:
   closing said contacts with a first magnetic flux;
   reducing the magnitude of said first magnetic flux until said contacts reopen;
   closing said contacts with a second magnetic flux having a polarity opposite to said first magnetic flux;
   passing a current through said contacts each time they are closed by a magnetic flux, said current passing through said contacts in the same direction each time; and
   measuring the electrical potential developed across said contacts in response to each application of said current.

3. In a method for measuring contact resistance in a switch having encapsulated contacts which engage and disengage in response to the application of a magnetic flux, the steps comprising:
   applying a first magnetic flux for said switch to cause said contacts to engage;
   passing a first current of predetermined magnitude through said engaged contacts;
   measuring the potential developed across said contacts by said first current;
   removing said first current;
   removing said first magnetic flux until said contacts disengage;
   applying a second magnetic flux to said switch to cause said contacts to reengage, said second magnetic flux having a polarity opposite to said first magnetic flux;
   applying a second current through said reengaged contacts, said second current having the same magnitude and direction as said first current; and
   measuring the potential developed across said reengaged contacts by said second current.

4. In a method for measuring contact resistance in a switch having encapsulated contacts which engage and disengage in response to the application of a magnetic flux and which have contact surfaces made of homogenous contact material, the steps comprising:
   applying a magnetic flux to said switch to cause said contacts to engage each other;
   passing a first current of predetermined magnitude through said engaged contacts;
   measuring the potential developed across said contacts by said first current;
   interrupting said first current;
   passing a second current through said engaged contacts, said second current flowing through said contacts in the opposite direction to the flow of said first current; and
   measuring the potential developed across said engaged contacts by said second current.

5. In a method for measuring contact resistance in a switch having encapsulated contacts which engage and disengage in response to the application of a magnetic flux which have contact surfaces made of homogenous contact material, the steps comprising:
   applying a current to a coil arranged to supply magnetic flux directly to said contacts, said current having a magnitude sufficient to induce a magnetic flux in said coil strong enough to close said contacts;
   applying a current through said contacts when closed;
   measuring the potential developed across said closed contacts;

reversing the direction of flow of one of said currents; and measuring the potential developed across said closed contacts.

References Cited
UNITED STATES PATENTS
| | | | |
|---|---|---|---|
| 3,065,414 | 11/1962 | Sears | 324—73 XR |
| 3,250,989 | 5/1966 | Koda | 324—28 |
| 3,325,695 | 6/1967 | Brunette | 317—156 XR |
| 3,343,077 | 9/1967 | Brader | 324—28 |

OTHER REFERENCES
Electric Contacts (Ragnar Holm), 1946, Almquist & Wiksells, Stockholm, Sweden, pp. 9–11, 40 and 41.

RUDOLPH V. ROLINEC, Primary Examiner

E. L. STOLARUN, Assistant Examiner

U.S. Cl. X.R.

324—64